(12) United States Patent
Rogers

(10) Patent No.: US 9,990,418 B1
(45) Date of Patent: Jun. 5, 2018

(54) SYSTEM AND METHOD FOR CREATING AN OPINION AND BEHAVIORAL DATA ECONOMY

(71) Applicant: 2020 IP, LLC, Nashville, TN (US)

(72) Inventor: Isaac David Rogers, Nashville, TN (US)

(73) Assignee: 2020 IP LLC, Nashville, TN (US)

( * ) Notice: Subject to any disclaimer, the term of this patent is extended or adjusted under 35 U.S.C. 154(b) by 0 days. days.

(21) Appl. No.: 15/640,967

(22) Filed: Jul. 3, 2017

Related U.S. Application Data

(60) Provisional application No. 62/509,179, filed on May 21, 2017, provisional application No. 62/508,899, filed on May 19, 2017.

(51) Int. Cl.
| | | |
|---|---|---|
| *G06F 7/00* | (2006.01) | |
| *G06F 17/30* | (2006.01) | |
| *G06Q 20/14* | (2012.01) | |
| *G06Q 30/02* | (2012.01) | |
| *H04L 29/08* | (2006.01) | |

(52) U.S. Cl.
CPC .. *G06F 17/30657* (2013.01); *G06F 17/30209* (2013.01); *G06F 17/30598* (2013.01); *G06F 17/30867* (2013.01); *G06Q 20/145* (2013.01); *G06Q 30/02* (2013.01); *H04L 67/104* (2013.01); *H04L 67/306* (2013.01)

(58) Field of Classification Search
CPC ......... G06F 17/30386; G06F 17/30557; G06F 17/30979; G06F 17/30657; G06F 17/30209; G06F 17/30598; G06F 17/30867

USPC ................................ 707/737, 748, 770, 776
See application file for complete search history.

(56) References Cited

U.S. PATENT DOCUMENTS

| | | | |
|---|---|---|---|
| 9,678,956 B2 | 6/2017 | Bell | |
| 9,681,297 B2 | 6/2017 | Lu et al. | |
| 2017/0091009 A1* | 3/2017 | Bhattacharyya | ...... G06F 11/079 |
| 2017/0109955 A1 | 4/2017 | Ernest et al. | |
| 2017/0142576 A1* | 5/2017 | Greaves | ................ H04W 4/206 |
| 2017/0161439 A1 | 6/2017 | Raduchel et al. | |
| 2017/0161829 A1 | 6/2017 | Mazier | |
| 2017/0169800 A1 | 6/2017 | Greco et al. | |

OTHER PUBLICATIONS

Tapscott, Don et al., Blockchain Revolution, 2016, pp. 115-144, Penguin Random House LLC, New York, NY, USA.
Diedrich, Henning; Ethereum, 2016, pp. 58-69, 166-179; Wildfire Publishing, Lexington, KY, USA.

* cited by examiner

*Primary Examiner* — MD I Uddin
(74) *Attorney, Agent, or Firm* — Andre J. Bahou

(57) ABSTRACT

A system and method for the opinion economy that allows a user to make a choice of what data, demographics, opinions, behaviors, beliefs, and other information to share. The system and method provides capability to a user to set a value for that user's data, opinions, behaviors, and beliefs. The system and method further allows for dynamic pricing for surveys or data collection, either dependent on length of time, effort given by the user, or other attributes that might drive the value the user sets on that user's participation.

24 Claims, 6 Drawing Sheets

| | | |
|---|---|---|
| | Anonymous Respondent Profile: | |
| 320 — OEB Profile ID | 48293398424 | — 325 |
| 330 — Date of Birth | 4-Jan-88 | — 335 |
| 340 — Contact Agency | XYZ Contact Company | — 345 |
| 350 — Home Zip Code | 37205 | — 355 |
| 360 — Gender | Male | — 365 |
| 370 — Date of Origination | 3-May-17 | — 375 |
| 380 — Country | USA | — 385 |
| 390 — Reputation Score Average | 9.4 | — 395 |
| 400 — Most Recent Survey | 1-May-17 | — 405 |
| 410 — Total Surveys to Date | 33 | — 415 |
| 420 — OE Coin Earnings | 1137.00 | — 425 |
| 430 — Total OE Coin Earnings | 4450.00 | — 435 |
| 440 — Current LOI Minute Price (Coins) | 2.0 Coins/Minute | — 445 |

| Linked Respondent "Public" Warehouse Data | | |
|---|---|---|
| Warehouse Question ID | Short Name | Value |
| 818357 | What Airline do you fly most? | Delta |
| 738215 | How many children are in your home? | 3 |
| 1587680 | What is your Job Title? | Electrician |
| 1511338 | What is your highest level of education? | S |
| 2643393 | What is your religion? | Catholic |
| 2732451 | What is your current car? | Audi |
| 2109561 | How many dogs do you have? | 2 |
| 991359 | Do you have IT purchase decision capability? | No |

Linked Respondent "Private" Warehouse Data

| Premium Question ID | Short Name | Value | Coin Value |
|---|---|---|---|
| 2520588 | Which of these medical conditions do you have? | Diabetes (211), Hypertension (44) | 3 |
| 1302548 | Link to anonymous daily browsing data file | 57as8349fcveiew | 4 |
| 839545 | Netflix User Record in Proprietary Database | netflixID4894893w | 5 |
| 1563938 | LinkedIN Profile ID | linkedin.com/isaacrogers | 6 |

SYSTEM AND METHOD FOR CREATING AN OPINION AND BEHAVIORAL DATA ECONOMY

The present application claims the benefit of Provisional Applications No. 62/508,899, filed May 19, 2017, and No. 62/509,179, filed May 21, 2017, the contents of which are incorporated by reference.

TECHNICAL FIELD

The present invention generally relates to opinion research, consumer behavior research, and data collection, and more particularly, to the methods and systems for utilizing an electronic database in the opinion economy.

BACKGROUND

Market research is the application of opinion surveys and data collection that are systematically gathered and interpreted to utilize information about individuals and/or organizations to gain insight, including insight into one's decision making propensity, behaviors, or beliefs. That insight is valuable information and useful data for statistical and analytical methods to aid organizations in making decisions to conduct business. During the first generation of market research, surveys were conducted by going door-to-door collection methods. For the second generation, surveys were generally conducted by postal mail. Then, the third and fourth generations of surveys were conducted via the telephone and Internet, respectively.

SUMMARY

The present invention generally relates to opinion research, consumer behavior research, and data collection. More particularly, the present invention relates to a novel application of permitting a user to associate value (e.g., monetary value) with a user's data, including utilization of Blockchain and distributed ledger technology in the opinion economy to improve reliability, credibility, and efficiency in research data collection.

The present invention, in one embodiment, contemplates a computer-implemented system and method for receiving data, collecting data, and storing data in an electronic database that allows a user to associate value with that user's data. Another embodiment of the invention contemplates utilizing Blockchain technology and a cryptographic distributed ledger for a novel application in the opinion and behavioral data economy. The Opinion Economy Blockchain (OEB) includes an OEB-enabled survey platform or data portal that interacts with brands and research firms that are conducting surveys. The Opinion Economy Blockchain also includes a data warehouse and an OEB authentication and permission voting system. The brands and research firms may use the OEB system and methods to interact with contact agencies. The contact agencies communicate with respondents who provides opinions and data and respond to surveys to populate data in the OEB linked respondent data warehouse. The OEB system creates an alternative marketplace to today's panel and survey data collection environment; in this new invention, the system allows a user or a person control of the value and access to the data they share with brands and research companies. Further, also using a cryptographic distributed ledger, such as Blockchain, the present invention overcomes the problems in prior systems.

It is understood that both the foregoing general description and the following detailed description are exemplary and exemplary only, and are not restrictive of the invention as claimed.

BRIEF DESCRIPTION OF THE DRAWINGS

The accompanying drawings, which are incorporated in and constitute a part of the specification, illustrate exemplary embodiments of the invention. Together with the description, they serve to explain the objects, advantages, and principles of the invention. In the drawings:

FIG. 2 is a block diagram of an exemplary respondent profile.

FIG. 3 is a block diagram of an exemplary linked respondent warehouse data structure.

FIG. 4 is a block diagram of yet another exemplary linked respondent warehouse data structure.

DETAILED DESCRIPTION

Reference will now be made in detail to exemplary embodiments of the invention, some aspects of which are illustrated in the accompanying drawings.

The present invention is directed to a system and method for the use of Blockchain in the opinion and behavioral data economy. As discussed below, the system and method of the present invention provides the capability for consumers to realize the value of sharing their opinions and behaviors either with another agency or directly with brands. Leveraging Blockchain technology in this invention allows, for example, a proven and reliable methodology for creating an anonymous, reliable, and public marketplace for opinion and behavioral data. In one embodiment, users enroll into the Opinion Economy Blockchain ("OEB") system 100 shown in FIG. 1. By way of example, a user 240 may register online with a contact agency 210. The contact agency 210 may conduct a series of identity checks. When, optionally, intense identity checks are performed, a contact agency 210 may assign a higher profile ranking for higher intensity authentication of a user's identity. Once a contact agency 210 verifies that a user 240 meets certain criteria, the user's profile 310 is approved.

Figure 1:
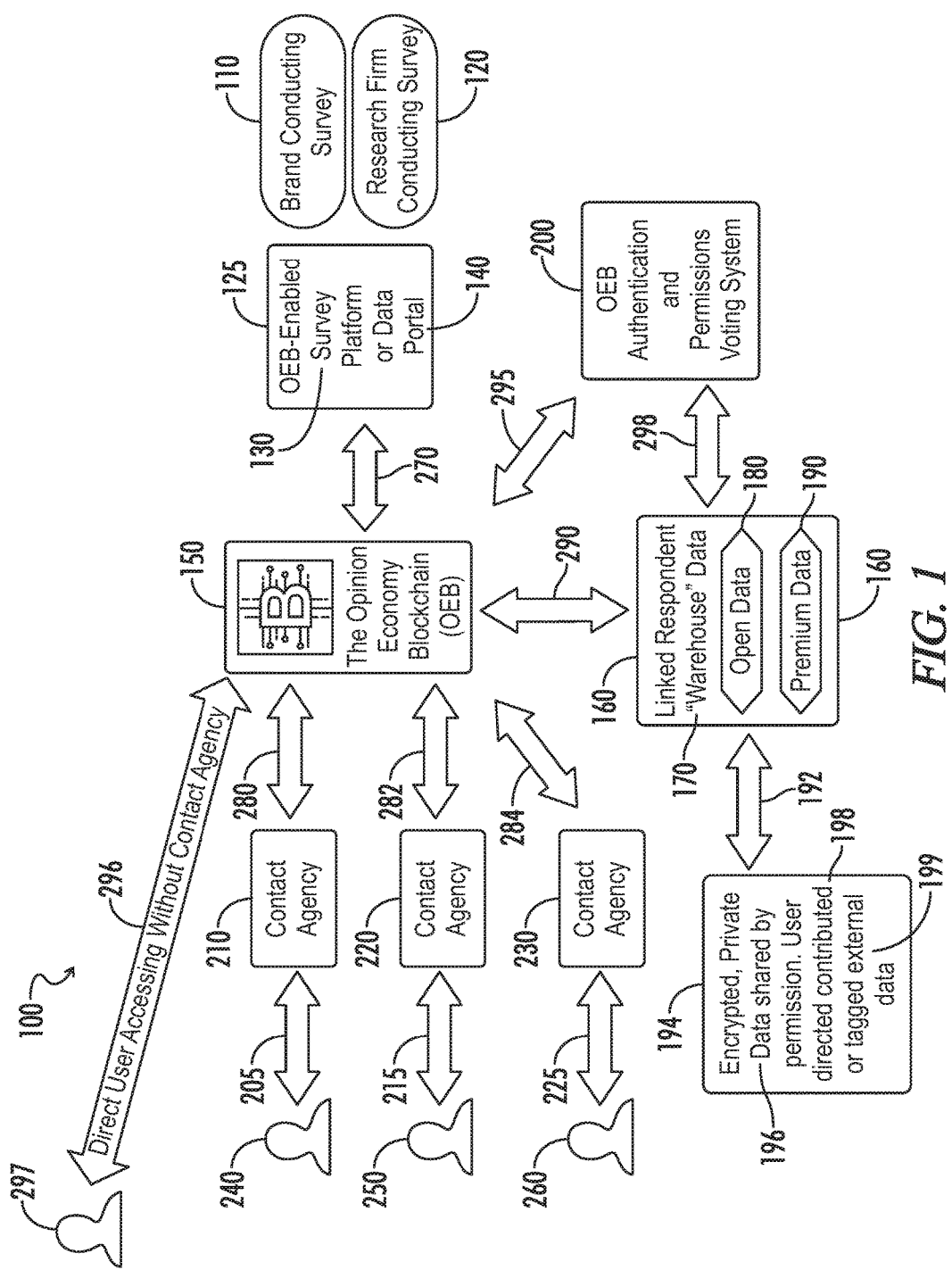
FIG. 1 is a block diagram of an exemplary Opinion Economy Blockchain incorporating certain aspects of the present invention.

FIG. 1 depicts an exemplary Opinion Economy Blockchain system 100 incorporating certain aspects of the disclosed embodiments. By way of example, FIG. 1 shows an exemplary OEB-enabled platform 125 (including a survey platform 130 or data portal 140), an Opinion Economy Blockchain system 150, a contact agency 210, an example linked respondent data warehouse 160, and an OEB authentication and permissions voting system 200.

In one embodiment, a computer-implemented system and method 100 for receiving data and storing data in an electronic database 160 allows a user 240 to associate value with that user's data 300, 500, and 800. Another embodiment of the invention contemplates utilizing Blockchain technology or a cryptographic distributed ledger for a novel application in the opinion and behavioral data economy. An embodiment of the Opinion Economy Blockchain (OEB)

100 includes an OEB system 150, an OEB-enabled survey platform 130 or data portal 140 that interacts with brands 110 and research firms 120 that are conducting surveys. The OEB platform 125 may communicate 270 via a Blockchain system 150 that is further in communication 280 with at least one contact agency 210 and further in communication 205 with at least one user 240. Alternatively, the Blockchain system 150 may communicate 296 directly with a user 297.

The Opinion Economy Blockchain environment 100 also includes linked respondent data warehouse 160 in communication 290 with the Blockchain network system 150 and in communication 295 with an OEB authentication and permission voting system 200. The respondent data warehouse 160 may alternatively communicate 298 with an OEB authentication and permission voting system 200. The brands 110 and research firms 120 use the OEB system and methods 100 to interact with a contact agency 210. By way of example, a contact agency 230 communicates 225 with a user 260. It is understood further that many contact agencies 210, 220, 230 may communicate with many users 240, 250, 260 who provide opinions and data and respond to surveys to populate data in the OEB linked respondent data warehouse 160 and/or database 194. Database 194 is associated 192 with data warehouse 160 and in further association and communication 290 with the OEB system 150. Database 194 may include a variety of data, which may be associated with premium data 190 or other features in data warehouse 160. As explained in FIG. 1, database 194 may store encrypted, private data 196 associated with a user's permission to share some, all, or selected portions of that user data. Further, data store 194 may include direct data 198 that a user contributes to the system by various collection methods and/or sources. It is understood that data collection methods or sources via direct contribution may include data from mobile devices, internet browsing history, credit card transactions, shopper buying habits associated with loyalty cards, medical records, fitness data from wearable tracking devices, automobile driving data, sensors located in a user's home, wireless sensors deployed anywhere associated with a user's activities, video streaming history, online shopping habits, online shopping purchases, television view history, and any form of data collection method or source in which the system may collect and store data associated with a user. By way of further example, external tagged data 199 may be linked and associated with the above data collection methods or sources and stored in database 194. Alternatively, tagged external data 199 may also be stored in other external systems associated with the user and/or the user's profile in the OEB system 150.

The OEB system creates an alternative marketplace to today's panel and survey data collection environment; in this new invention, the system allows a user or a person control of the value of user data and control the access to the data they share with brands, firms, and research companies. Using a secure electronic database or a cryptographic distributed ledger, such as Blockchain, the present invention overcomes the problems in prior systems.

FIG. 2 is a block diagram of an exemplary user data structure 300, titled in this embodiment as an anonymous respondent profile 310. The OEB profile identification 320 may have a value "48293398424" 325 associated with that profile identification 320. Likewise, the data structure 300 may include various fields, for example date of birth 330, contact agency 340, home zip code 350, gender 360, date of origination 370, country 380, reputation score average 390, most recent survey 400, total surveys to date 410, opinion economy coin balance 420, total opinion economy coin earnings 430, current loi (length of interview) minute price (coins) 440, and various other fields associated with a variety of data.

FIG. 3 is a block diagram of an exemplary respondent warehouse data structure 500, titled in this embodiment as linked respondent public warehouse data. In this embodiment, the warehouse data structure 510 depicts three columns. The three columns of this embodiment of warehouse data structure 510 include warehouse question identification 520, short name 610, and value 700. It is understood by one of skill in the art that this structure is merely exemplary. An exemplary warehouse question identification 520 may have a value "818357" 530 that corresponds to a short name 610 such as "What Airline do you fly most?" 620 and a further value 700 recorded as "Delta" 710. As shown in FIG. 3, the warehouse data structure 510 may include a variety of information associated with values as shown in the exemplary data structure 500.

FIG. 4 is a block diagram of yet another exemplary respondent warehouse data structure 800, titled in this embodiment as linked respondent private warehouse data. In the embodiment shown on FIG. 4, the warehouse data 810, may include various columns, fields, records, and values. In this exemplary embodiment, premium question identification 820, has an associated value "2520588" 855 associated to the short name 830 with data "Which of these medical conditions do you have?" 875 further associated with a value 840 shown as "Diabetes (211), Hypertension (44)" 895 and a coin value 850 listed in this embodiment as "3" 915.

Figure 5:
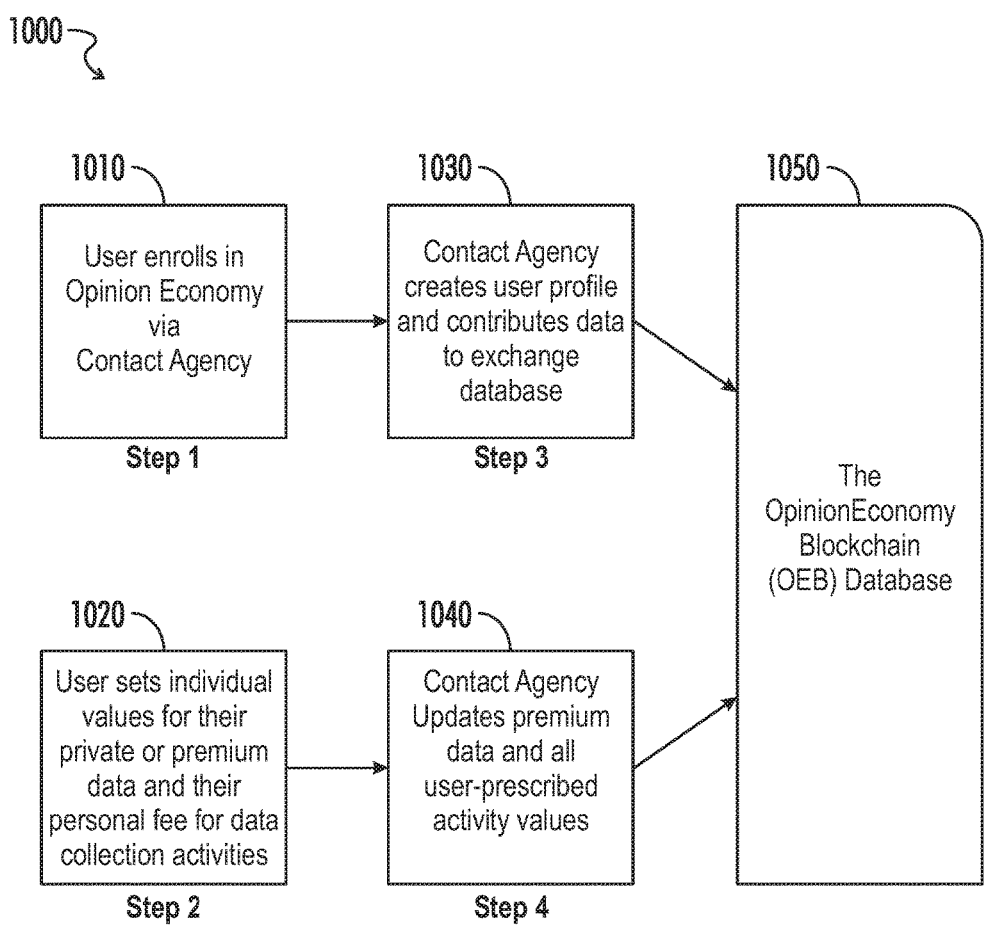
FIG. 5 is an exemplary flowchart illustrating a user enrolling in the system and a contact agency managing, coordinating, and updating user data.

FIG. 5 is an exemplary flowchart 1000 illustrating step 1 showing a user enrolling in the system 1010 and in step 2 setting value for that user's data 1020. It is understood that a user may both enroll in the system and set value for the user's data either in one step or in various steps. Likewise, a user may update values that the user associates with the user's data at any time. In step 3 1030, a contact agency creates a user's profile and may contribute data to the Opinion Economy database 1050. Similarly, in step 4 1040, a contact agency may update user data and all user-prescribed activity values.

Figure 6:
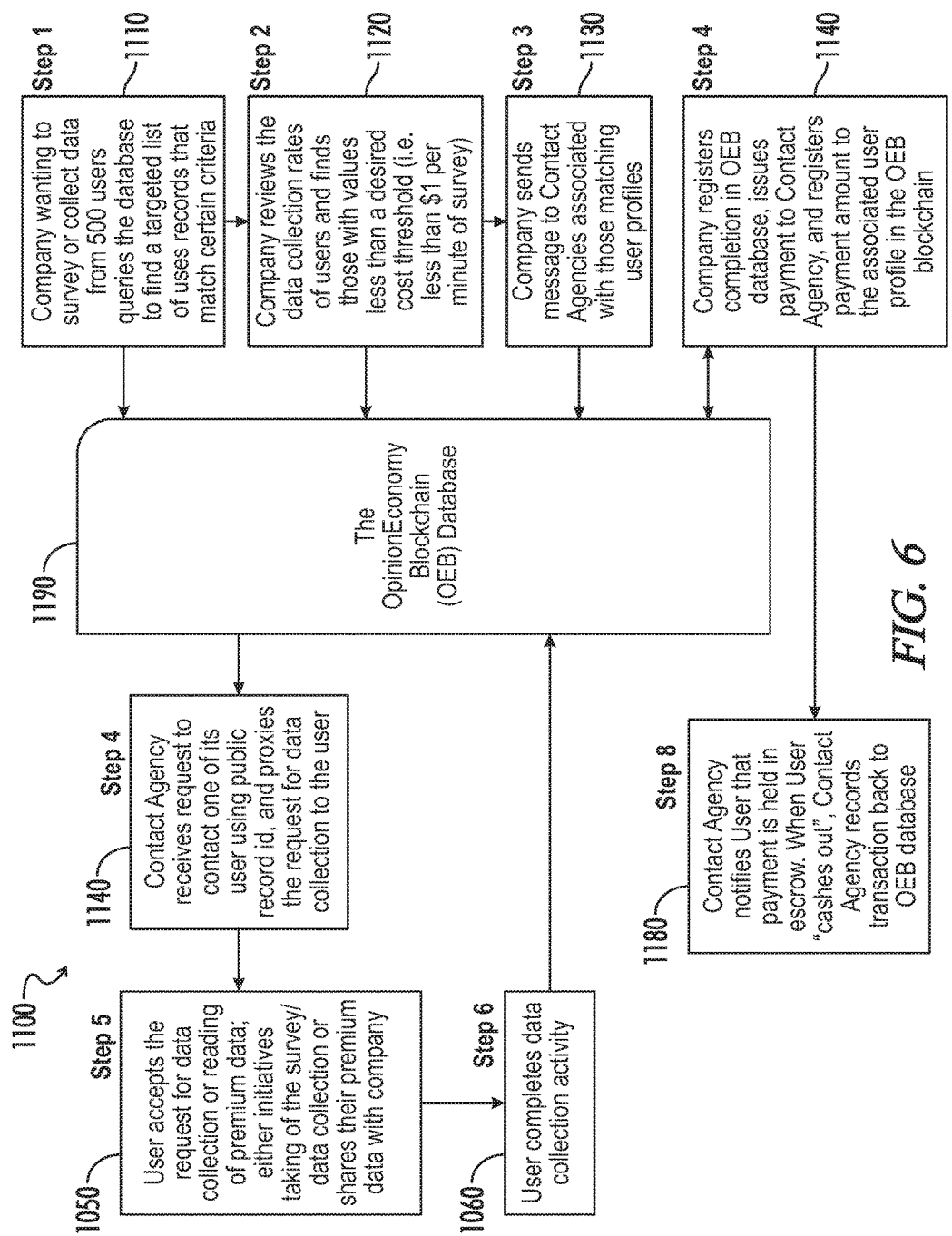
FIG. 6 is an exemplary flowchart illustrating a company or firm initiating a data collection activity.

FIG. 6 is an exemplary flowchart 1100 illustrating a company or firm initiating a data collection activity. In step 1 1110, a company, firm, or brand wanting to collect data from, for example, 500 users may query the OEB system and associated databases 1190 to find a targeted list of users that match certain criteria. Upon identifying those desired users, in step 2 1120 the firm may review the data collection rates of users and select users with a low-cost threshold. That is, the system allows a firm to select users for a data collection activity that gives a lower cost but obtains data from users matching criteria for a desired sample set. A firm sends a message in step 3 1130 to a contact agency associated with those user profiles matching the criteria selected by the firm. A contact agency in step 4 1140 receives a request to contact one of its users using a public record identification. Upon doing so, the contact agency proxies the request for data collection to that selected user. In step 5 1150, a user may accept the request for a data collection activity or reading request for premium data. Further in step 5 1150, the user may perform the data collection activity, such as taking a survey or interview, or permit sharing of a user's data (including premium data or data collected from various data collection methods or sources) with the firm, company, or brand. When a user completes a data collection activity in this example step 6 1160, the data may be transmitted to the Opinion Economy database 1190. Likewise, it should be understood that if the data requested by a firm is a passive collection activity, such as Netflix viewing history, step 6 1160 may be performed over time with many data points being submitted to the system (either passively, actively, periodically, or otherwise collected depending on the data collection method or data source).

The firm or company in step 7 1170 may register completion of the data collection activity in the OEB system database 1190. Upon doing so, the firm would issue payment to a contact agency. Additionally in step 7 1170, the contact agency may likewise record or register a payment amount in the user profile with the associated user in the OEB database 1190. The contact agency in step 8 1180 notifies a user that payment is held in escrow. When the user requests to receive payment or "cash out" in step 8 1180, a contact agency facilitates payment of real world currency to the user and records the transaction to the OEB database 1190.

For approved users in one embodiment of the invention, the contact agency sets up (a) an email relay system to route messages to the user's preferred email, (b) a payment method to transfer real-world funds to the user, and (c) the user's OEB public profile. The contact agency, may also setup or create the first record of that user in the OEB. In another embodiment of the invention, the OEB system is capable of moving a user's records from one contact agency to another contact agency.

In yet another embodiment of the invention, the contact agency has authority to manage users within the contact agency's network. For example, using Blockchain or similar cryptographic distributed ledger to host and validate key respondent demographics (like age, income, gender), the OEB System allows a contact agency and/or the user to update this information as needed (for example, updating information when the user moves such as a ZIP code change).

By way of further examples, a contact agency may create the new user profile, update certain user profile settings, or "cash out" the user when the user has accumulated points or coins (an example of a measurement of value managed in the OEB System) by completing surveys, contributing data, or by having existing data read by others associated with the system. The contact agency holds the actual funds (e.g., monetary value) in escrow until appropriate to distribute the funds. The user or person may request a distribution of funds, or the OEB may setup distribution of fund payments by other procedures. It is understood that once a user or person has completed a survey or been paid for their data, that user or person may also be referred to as a respondent in the OEB system. The point or coin balance is managed in one embodiment of the invention and may be updated to reflect a payment to the respondent. Likewise, the point, coin, or cumulative balance may be updated upon a brand or firm passively reading user data. A further aspect of the OEB System allows the user to control the level of access to data, including identity, anonymity, personally identifiable information and the like.

In a further exemplary embodiment of the invention, a brand or research firm may initiate a request to conduct a survey or collect data. The brand or research firm may utilize a connected OEB tool that can read the Blockchain or query an existing warehouse of data to find precise OEB respondent records. The system allows a contact agency to identify potential respondents who might take surveys by querying the ledger. In using this aspect of the invention, the contact agency preserves anonymity while allowing indirect access to the user.

A brand or research firm may choose to engage certain respondents in a survey. The OEB-Enabled survey tool sends direct messages to the contact agencies with records of users/respondents with whom the brand or research firm would like to engage in a survey, data collection process, or data collection activity. The contact agency likewise sends an email to the user's actual email via proxy message. When the user clicks the link, the user is directed to the OEB survey. The user then may complete the survey to earn monetary value, points, or coins. A feature of the invention allows the user's known profile and warehouse data to be automatically brought into the survey, bypassing tedious data entry. Survey software can identify a user via a cookie/hash in the user's profile data and skip over the monotonous "demographics" questions that are asked at the beginning of every survey. With the distributed ledger pre-filling validated data, this feature saves time in survey and allows the survey to rely on the typical user data, such as demographic info. The present invention system may include a standardized public (yet anonymous) profile that all contact agencies and survey companies could utilize.

Upon respondent's completion of the survey, the survey platform adds points or coin value to the user's Blockchain account (which is held in escrow by the contact agency) for completing the session and updates any data fields about the respondent with new data. The survey platform transmits real world currency to the contact agency to hold and fund the escrow accounts of its users held by the contact agency. If the user decides to withdraw monetary value or 'cash out,' the appropriate contact agency reduces the user's account and transfer monetary value (e.g. dollars) to the user. The monetary value can be held in escrow by the contact agency until the survey is completed. The contact agency can earn a transaction fee on the real-world cash-out to the user, and/or the contact agency may also earn a second transaction fee on the distribution of real world funds and management of the escrow account of the money held for the user.

In another aspect of the invention, if a user's record does not appear to be authentic or if the user is providing erroneous data, a feature of the invention allows the survey platform or brand to rate the respondent accordingly based on the quality of the data or opinions provided and decreases or increases the user's average feedback rating in the system.

Additionally, records with inconsistent patterns of participation or data contribution or over-utilization might be selectively avoided. This feature of the invention allows the contact agency to set a reputation score for respondents.

In another aspect of the invention, certain brands might only query for users with high average feedback but low per-minute survey prices. This feature of the invention allows the brands to select high-quality respondents while paying a more efficient price.

In another aspect of the invention, the contact agency or OEB-enabled survey platform communicates with the OEB Authority for an application to be a member of the OEB System. The application data is reviewed and audited. This application data is posted for review to the existing contact agency's and OEB's survey platforms and any other voting members of the system. In one example, the OEB existing members "vote" to allow this new member access to the OEB system.

Another feature of the present invention allows the OEB system to create "Warehouse Questions." For any new proposed question or data point that is submitted by the brands or research firm, the OEB Authority may provide the initial review. If the new proposed question or data point is approved, the existing members must vote to create the new warehouse question and add the new questions to the System in either a public or private data store associated to the OEB System.

Premium data is another feature of the present invention. In one embodiment of the OEB System, premium data is encrypted or secured private data that may be provided via the contact agency on authority of the user or appended by specific surveys or data collection tools with the respondent's distinct permission. Some examples of premium data could be user contact information, browser history, passive data collected from mobile devices, a person's actual email address, physical address, driving habits, medical history, or any other similar data point. It is understood that premium data could comprise any sensitive information that either the user considers to be worth a premium value or that the brand/research firm desires as premium value based upon desired research criteria. By way of example, when a piece of data is queried, a point or coin value, whose access value is set by the individual respondent, is sent to the respondent's account. It is understood that another aspect of this invention allows public data, private data, and/or premium data to be read or queried by many firms (for example, members of the OEB system) at any time and in exchange the respondent passively collects income by sharing his/her data.

In the Opinion Economy Blockchain, the user makes the choice of what data, demographics, opinions, behaviors, beliefs, and other information to share. In addition, the consumer decides the value of his/her data and gets to tell the marketplace what his/her data is worth. The Opinion Economy Blockchain system allows an anonymous respondent to get paid more depending on desired demographics or other profile information. It is understood that the OEB invention allows for dynamic pricing for surveys or data collection, either dependent on length of time, effort given by the user, or other attributes that might drive the value the user sets on their participation. The consumer/user/respondent can set a higher value for more sensitive or private data, such as driving habits, video streaming habits, or other information.

The respondent also gets to set his/her own fee for service (the coins/points/money he/she will do a survey) that could relate potentially to a given length of survey, time required, level of detailed information, a personal attribute, or other criteria (e.g., tenured architect completing a 15-minute survey versus a college architecture student taking a 2-minute survey). Moreover, the OEB System allows the respondent to set his/her own "value" on her/his opinions and time in surveys. Using this invention, the respondent may anonymously advertise his/her fees and survey companies can choose who to survey based on the respondent's own stated rates. This facet of the invention effectively creates a free market value for taking surveys or sharing passive and/or previously collected data. This invention improves the survey economy by allowing the respondent to state his/her value for the service and obtain that value directly.

The OEB system allows, as another benefit of the invention, the respondent to offer or sell data, including passive/private data at a market rate set by the respondent, and allows other companies to pay a small fee every time that existing data is read, reviewed, accessed, studied, examined, or otherwise consumed. Some of this data might be contributed data linked from other systems or databases; for example, respondents may be able to link their Netflix account history, their grocery store loyalty card number, their medical records, or their gym membership access information to their data in the OEB system. This may be a custom link that only the linked data company can view (so Netflix can tag a user with their account ID anonymously with the permission of the user), so the linked or correlated data is shared in a way only the third party can interpret or correlate. This also allows a variety of the existing system data to be correlated to this linked data across various platforms.

In another embodiment of the invention, allowing a fee-for-contact to be set by the respondent, users of the system who are attempting to directly market to users based on the wealth of data contained in the system can search the data for free, then pay to access some or all of the private data they might be interested in reviewing, then perhaps pay an additional fee (set by the respondent) to agree to release the respondent's contact information or private premium data (e.g., PII (Personally Identifiable Information)) so the marketer could hyper-target this user with a high-value ad or email. For example, an OEB member entity could search and review the database for people in Nashville, then for income level, which both may be considered data in the system that is available for viewing by members of the system or by a non-OEB-member. Then, the OEB Member may pay to access the Private data on a specific data field, such as "car type." Further still, the OEB Member may focus or filter the search results on Nashville Audi drivers who make over a certain amount of income. OEB Members may also pay the fee-for-contact price for some or all of those Nashville Audi drivers to deliver a custom advertisement to them at the market rate each individual sets in his/her profile.

Another characteristic of the present invention allows companies, brands, or even entities like governments or regulatory bodies to log and or review all payments to the respective respondents. This invention promotes compliance with applicable laws, rules, and regulations. Because each individual respondent's record of activities and transactions is logged, registered, recorded and generally memorialized in the publicly auditable trail, this allows for a more transparent system. This aspect of the invention allows "sunshine laws" and other similar compliance issues to be fully documented and clear up a massive regulatory liability.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method comprising:
   using a cryptographic distributed ledger that includes an Opinion Economy Blockchain (OEB) enabled survey platform that interacts with a research firm to conduct surveys, wherein the cryptographic distributed ledger is capable of:
   receiving data from at least one user wherein the user controls value of the user's data and the user controls access to the user's data shared with brands, research companies, and other entities;
   storing said data in an electronic OEB database wherein the research firm queries the OEB database to find a list of users that match at least one criteria;
   permitting said at least one user to associate a first value with said data to share a portion of said data;
   correlating said data associated with said user from a source with additional data received from at least one additional source;

storing said data from said source, wherein said data from said source includes browsing history associated with said user;

storing said additional data from said at least one additional source;

analyzing said browsing history associated with said user and said additional data from said at least one additional source;

tagging said additional data associated with said user from said additional source;

receiving, by the contact agency, a fee for collecting said data from said user;

preserving anonymity of said user; and allowing the research firm to offer a price to said user based upon criteria selected from a group consisting of said user's reputation score, demographic, feedback rating, or quality of opinions provided.

2. The computer-implemented method of claim 1, wherein said additional data from said additional source includes a medical record associated with said user.

3. The computer-implemented method of claim 1, wherein said additional data from said additional source includes additional survey data associated with said user.

4. The computer-implemented method of claim 1, wherein said additional data from said additional source includes data from an Internet of Things device associated with said user.

5. The computer-implemented method of claim 1, wherein said additional data from said additional source includes data from a computing device associated with said user.

6. The computer-implemented method of claim 1, wherein said additional data from said additional source includes data from an Internet-connected sensor associated with said user.

7. The computer-implemented method of claim 1, wherein said additional data from said additional source includes behavioral data from a third-party source.

8. The computer-implemented method of claim 1, wherein said additional data from said additional source includes data from shopping or buying associated with said user.

9. The computer-implemented method of claim 1, wherein said additional data from said additional source includes data from video streaming associated with said user.

10. The computer-implemented method of claim 1, wherein said additional data from said additional source includes data from a wireless sensor associated with said user.

11. The computer-implemented method of claim 1, wherein said additional data from said additional source includes data from a credit card associated with said user.

12. The computer-implemented method of claim 1, wherein said additional data from said additional source includes data from a wearable device associated with said user.

13. The computer-implemented method of claim 1, further comprising storing a reputation score of said at least one user.

14. The computer-implemented method of claim 1, further comprising encrypting a portion of said data associated with said at least one user.

15. The computer-implemented method of claim 1, further comprising rating said at least one user based upon said data.

16. The computer-implemented method of claim 1, further comprising contacting, by the research firm, said at least one a user via a contact method designated by said at least one user.

17. The computer-implemented method of claim 1, further comprising populating, in at least one field, a portion of said data associated with said at least one user upon said at least one user performing a data collection activity.

18. The computer-implemented method of claim 1, further comprising receiving said additional data associated with a data collection activity from said at least one user.

19. A method comprising configuring a computer system including memory and at least one processor to perform steps of:

using a cryptographic distributed ledger that includes an Opinion Economy Blockchain (OEB) survey platform that interacts with a research firm to conduct surveys, wherein the cryptographic distributed ledger is capable of:

receiving data from at least one user wherein the user controls value of the user's data and the user controls access to the user's data shared with brands, research companies, and other entities;

storing said data in an electronic OEB database wherein the research firm queries the OEB database to find a list of users that match at least one criteria;

permitting said user to associate a first value with said data;

permitting said user to share a portion of said data;

correlating said data associated with said user from a source with additional data received from at least one additional source;

storing said data from said source, wherein said data from said source includes survey data associated with said user;

storing said additional data from said at least one additional source;

analyzing said survey data associated with said user and said additional data from said at least one additional source;

tagging said additional data associated with said user from said additional source;

receiving, by the contact agency, a fee for collecting said data from said user; and allowing the research firm to offer a price to said user based upon criteria selected from a group consisting of said user's reputation score, demographic, feedback rating, or quality of opinions provided.

20. The system of claim 19, wherein said additional data from said additional source includes browsing history data associated with said user.

21. The system of claim 19, wherein said additional data from said additional source includes data from an Internet-connected device associated with said user.

22. A non-transitory computer-readable storage medium, having stored thereon instructions executable by a computer, wherein the computer executes the instructions to implement a method comprising:

using a cryptographic distributed ledger that includes an Opinion Economy Blockchain (OEB) survey platform that interacts with an entity to conduct surveys, wherein the cryptographic distributed ledger is capable of:

receiving data from at least one user wherein the user controls value of the user's data and the user controls access to the user's data shared with brands, research companies, and other entities;

storing said data in an electronic OEB database wherein the entity queries the OEB database to find a list of users that match at least one criteria;

permitting said user to associate a first value with said data;

permitting said user to share a portion of said data;

correlating said data associated with said user from a source with additional data received from at least one additional source;

storing said data from said source, wherein said data from said source includes survey data associated with said user;

storing said additional data from said at least one additional source;

analyzing said survey data associated with said user and said additional data from said at least one additional source; and tagging said additional data associated with said user from said additional source;

receiving, by the contact agency, a fee for collecting said data from said user; and allowing the entity to offer a price to said user based upon criteria selected from a group consisting of said user's reputation score, demographic, feedback rating, or quality of opinions provided.

23. The computer-readable medium of claim 22, wherein said additional data from said additional source includes browsing history data associated with said user.

24. The computer-readable medium of claim 22, wherein said additional data from said additional source includes data from an Internet-connected device associated with said user.

* * * * *